(12) United States Patent
Yamaguchi et al.

(10) Patent No.: US 9,979,025 B2
(45) Date of Patent: May 22, 2018

(54) CARBON BLACK AND SECONDARY CELL USING THE CARBON BLACK AS ELECTROCONDUCTIVE AGENT

(71) Applicant: ASAHI CARBON CO., LTD., Niigata-shi, Niigata (JP)

(72) Inventors: Togo Yamaguchi, Niigata (JP); Nozomi Arimitsu, Niigata (JP)

(73) Assignee: ASAHI CARBON CO., LTD., Niigata-shi, Niigata (JP)

(*) Notice: Subject to any disclaimer, the term of this patent is extended or adjusted under 35 U.S.C. 154(b) by 36 days.

(21) Appl. No.: 15/107,756

(22) PCT Filed: Oct. 31, 2014

(86) PCT No.: PCT/JP2014/079046
§ 371 (c)(1),
(2) Date: Jun. 23, 2016

(87) PCT Pub. No.: WO2015/098286
PCT Pub. Date: Jul. 2, 2015

(65) Prior Publication Data
US 2016/0322640 A1    Nov. 3, 2016

(30) Foreign Application Priority Data

Dec. 24, 2013   (JP) ................. 2013-265351

(51) Int. Cl.
*H01M 4/62* (2006.01)
*C09C 1/48* (2006.01)
*H01M 4/36* (2006.01)

(52) U.S. Cl.
CPC ............... *H01M 4/625* (2013.01); *C09C 1/48* (2013.01); *H01M 4/366* (2013.01); *C01P 2004/64* (2013.01); *C01P 2006/12* (2013.01); *C01P 2006/19* (2013.01); *C01P 2006/40* (2013.01)

(58) Field of Classification Search
CPC ... H01M 4/625; H01M 4/366; C01P 2004/64; C01P 2006/12; C01P 2006/19; C01P 2006/40; C09C 1/48
See application file for complete search history.

(56) References Cited

U.S. PATENT DOCUMENTS

2002/0051903 A1   5/2002   Masuko et al.
2006/0186383 A1   8/2006   Matsuki et al.

FOREIGN PATENT DOCUMENTS

| JP | 2000-348537 A | 12/2000 |
| JP | 2003-234099 A | 8/2003 |
| JP | 2005-307070 A | 11/2005 |

(Continued)

OTHER PUBLICATIONS

International Search Report of PCT/JP2014/079046, dated Jan. 20, 2015. [PCT/ISA/210].

(Continued)

*Primary Examiner* — Laura Weiner
(74) *Attorney, Agent, or Firm* — Sughrue Mion, PLLC

(57) ABSTRACT

The purpose of the present invention is to provide a carbon black capable of efficiently covering the surface of an electrode active material and enhancing the electric current collection effect as an electroconductive agent of a secondary cell. A carbon black comprising carbon black aggregates (2) in which the ratio PPA/d of the number of primary particles (1) (PPA) and the diameter d (nm) of the primary particles (1) is 8 or higher.

6 Claims, 3 Drawing Sheets

(56) References Cited

FOREIGN PATENT DOCUMENTS

| | | |
|---|---|---|
| JP | 2006-52237 A | 2/2006 |
| JP | 2006-210007 A | 8/2006 |
| JP | 2010-27458 A | 2/2010 |
| WO | 01/92151 A1 | 12/2001 |

OTHER PUBLICATIONS

Written Opinion of PCT/JP2014/079046, dated Jan. 20, 2015. [PCT/ISA/237].
Translation of International Preliminary Report on Patentability, dated Jul. 21, 2016, from the International Bureau in counterpart International application No. PCT/JP2014/079046.

CARBON BLACK AND SECONDARY CELL USING THE CARBON BLACK AS ELECTROCONDUCTIVE AGENT

CROSS REFERENCE TO RELATED APPLICATIONS

This application is a National Stage of International Application No. PCT/JP2014/079046 filed Oct. 31, 2014, claiming priority based on Japanese Patent Application No. 2013-265351, filed Dec. 24, 2013, the contents of all of which are incorporated herein by reference in their entirety.

TECHNICAL FIELD

The present invention relates to carbon black and a secondary cell using the carbon black as an electroconductive agent.

BACKGROUND ART

In recent years, secondary cells have been used across a very wide range of files and industries including electric automobiles and mobile telephones, and in accompaniment with the applications thereof, there are increasing performance-related demands for higher energy densities, higher output densities, faster charging/discharging, etc.

Various studies and development pertaining to various materials have been carried out in order to satisfy these demands, an example thereof being the development of an electroconductive agent that is optimal for a secondary cell.

Since electrode active materials themselves typically have low electroconductivity, an electroconductive agent is used during electrode production. The electroconductive agent enhances electroconductivity in an electrode by forming an electroconductive path between individual electrode active material particles or by covering the surface of the electrode active material to enhance the electric current collection effect, and has the effect of improving the performance of a secondary cell, which is the final product.

Acetylene black has been widely used as an electroconductive agent in the prior art. Acetylene black is dispersed and present in the electrode active material during use and forms a path between particles, but at present, since the particle diameter is relatively large, it is difficult to uniformly cover the surface of the electrode active material, the electric current collection effect is therefore low because the contact locations with the electrode active material are limited, and sufficient electroconductive effect cannot be obtained.

Acetylene black has few surface functional groups for reasons related to manufacturing methods, and does not readily disperse in aqueous solvents. Since this is a negative factor in relation to the electroconductive effect, there is a need for an electroconductive agent that has better performance.

In response to this problem, investigations are being made on electroconductive carbon black, in which the carbon black mainly manufactured by the furnace method has defined physical properties. Patent Document 1, for example, discloses a technique for using carbon black to manufacture an electrode active material for a lithium secondary cell, the carbon black having particles with a small diameter in which the nitrogen adsorption specific surface area (N2SA) is 200 g/m$^2$ or higher.

Patent Document 2 discloses a technique for covering the surface of the electrode active material by a combined used of two types of carbon black having different specific surface areas.

In addition, there are also inventions that specify the DBP absorption amount, which is an index of the aggregation size as the minimum unit of carbon black, and these conventional carbon blacks exhibit a constant effect in terms of covering the surface of the electrode active material. However, there is room for improvement in that there has been no research that focuses on the shape of carbon black optimal for covering.

In other words, the definition of carbon black for electrode applications is specified by the specific surface area of the carbon black and/or the DBP absorption amount. As far as the present applicants are aware, there is no example of the shape of a carbon black aggregate being observed from the viewpoint of the level of development of a carbon black aggregate as evaluated using the diameter of the primary particles constituting the carbon black aggregate and the number of these primary particles, and using these characteristics to specify the shape of an optimal carbon black aggregate in terms of covering the electrode active material of a secondary cell.

PRIOR ART DOCUMENTS

Patent Documents

[Patent Document 1] Japanese Patent Application Laid-open No. 2003-234099
[Patent Document 2] Japanese Patent Application Laid-open No. 2010-027458

DISCLOSURE OF THE INVENTION

Problems that the Invention is to Solve

In view of the current state of the art as described above and after repeated daily research and experimentation regarding the optimal shape of a carbon black aggregate for covering an electrode active material of a secondary cell, the present applicants ultimately found a shape of a carbon black aggregate that is capable of efficiently covering the surface of an electrode active material and enhancing the electric current collection effect as an electroconductive agent of a secondary cell.

In other words, an object of the present invention is to provide a carbon black and a secondary cell using the carbon black as an electroconductive agent capable of efficiently covering the surface of an electrode active material and enhancing the electric current collection effect in the form of an electroconductive agent of a secondary cell.

Means of Solving the Problems

The main points of the present invention will be described with reference to the attached drawings.

The present invention relates to a carbon black characterized in that diameter (d) of primary particles 1 constituting a carbon black aggregate 2 is 15 nm or less, the ratio (PPA/d) of the diameter (d) of the primary particles 1 and the number of the primary particles 1 (PPA) is 8 to 12, the dibutyl phthalate (DBP) absorption amount is 180 mL/100 g or more, and the nitrogen adsorption specific surface area is 300 m$^2$/g or higher.

The present invention also relates to a secondary cell characterized in that an electrode active material surface is covered by an electroconductive agent comprising the carbon black according to the first aspect.

Effects of the Invention

Structured in the manner described above, the present invention is a carbon black having excellent covering properties, e.g., the carbon black of the present invention efficiently covers the surface of an electrode active material and enhances the electric current collection effect of a secondary cell when the carbon black is used as an electroconductive agent of a secondary cell. An innovative carbon black can thereby be obtained in which performance can be further improved in terms of the various physical properties of the secondary cell, e.g., high energy density, high output density, and high-speed charge/discharge, and furthermore, significant effect can be demonstrated and effective application can be achieved in applications that require electroconductivity, such as capacitors and electroconductive pastes.

BEST MODE FOR CARRYING OUT THE INVENTION

Figure 1:
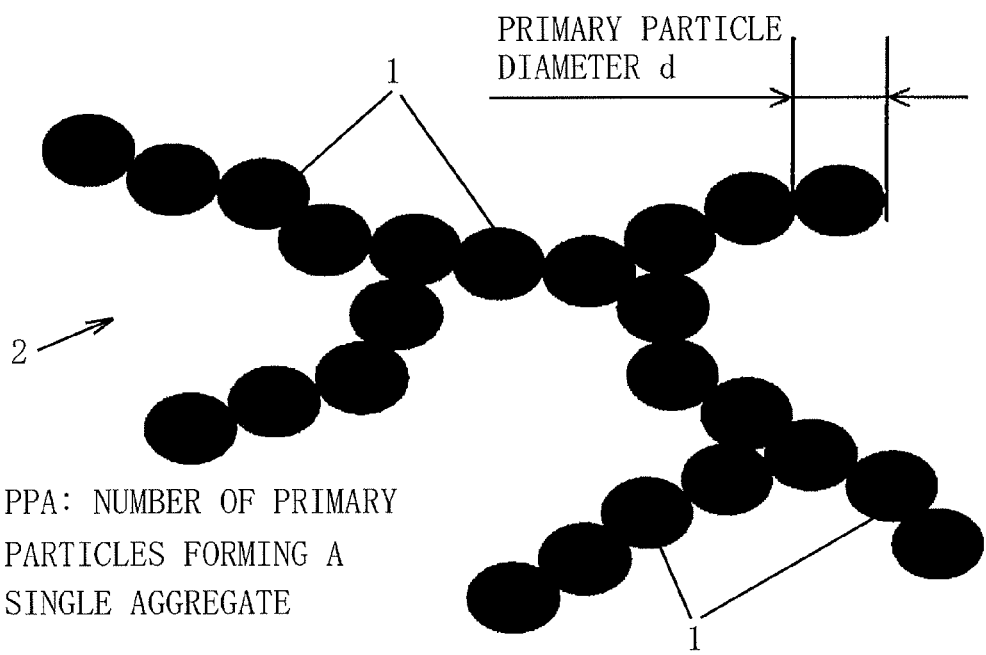
FIG. 1 is a descriptive view showing the carbon black aggregates of the present example.

Preferred embodiments of the present invention will be briefly described with reference to the diagrams while indicating the effects of the present invention.

The carbon black of the present invention has a ratio PPA/d of the number of primary particles 1 (PPA) constituting a carbon black aggregate 2 and the diameter d (nm) of the primary particles 1 that is 8 to 12 and the diameter d (nm) is 15 nm or less. Therefore, the carbon black aggregate 2 achieves a shape suitable for efficiently covering the electrode active material of a secondary cell.

In other words, the present applicants found from the result of repeated experimentation that when the diameter of the primary particles 1 is greater than the size of a carbon black aggregate 2, or when the number of primary particles 1 is low and structural length of the carbon black aggregate 2 is short in terms of the shape of the carbon black aggregate 2, specifically, when the ratio PPA/d of the number of primary particles 1 (PPA) constituting a carbon black aggregate 2 and the diameter d (nm) of the primary particles 1 is a value that is less than 8, the contact surface area of the carbon black on the electrode active material is reduced, covering properties are inferior, and improvement in the electroconductivity and electrode stability cannot be sufficiently obtained.

In addition, the present applicants confirmed from the results of repeated experimentation that when PPA/d is greater than 12, the electroconductivity enhancing effect cannot be sufficiently obtained because the diameter of the primary particles 1 is extremely small in comparison with the size of the carbon black aggregate 2, and the surface of the electrode active material cannot be uniformly covered, and because the structure of the carbon black aggregate 2 becomes bulky, dispersion characteristics in an electrode slurry are degraded during, e.g., electrode production for a secondary cell, and excessive adsorption occurs. Furthermore, there is a negative effect on processability during electrode production and electrode production costs are liable to increase due to the occurrence of excessive solvent absorption.

For example, structuring and using the carbon black of the present invention makes it possible for the carbon black to uniformly cover the entire surface of an electrode active material, improve the electroconductivity of the electrode active material, and improve the electrode stability of a secondary cell using the covered carbon black, whereby the electric current collection effect of the secondary cell can be enhanced and performance can be further improved in terms of the various physical properties of the secondary cell, e.g., high energy density, high output density, and high-speed charge/discharge.

Thus, the conventional definition of a carbon black for electrode application is specified by the specific surface area of the carbon black and/or the DBP absorption amount, and as far as the present applicants are aware, there is no example of the shape of a carbon black aggregate being observed from the viewpoint of the level of development of a carbon black aggregate 2 as evaluated using the diameter d of the primary particles 1 constituting the carbon black aggregate 2 and the number (PPA) of these primary particles 1, and using these characteristics to specify the shape of an optimal carbon black aggregate 2 in terms of covering the electrode active material of a secondary cell. In addition, the present invention is a carbon black that exhibits those optimal conditions, has completely novel characteristics, and demonstrates a dramatic effect that cannot be achieved by a conventional carbon black.

The particle number per aggregate (PPA) in the present invention indicates the number of carbon black primary particles 1 contained in single mass of carbon black aggregate 2, and refers to a value obtained by dividing the total particle number (nt in the specification) derived by CB morphological analysis by electron microscopy specified in ASTM D3849-13 by the number of observed carbon black aggregates 2.

The diameter d of the primary particles 1 indicates the diameter of the primary particles 1 constituting a carbon black aggregate 2, and refers to the mean particle diameter (m in the specification) derived by CB morphological analysis by electron microscopy specified in ASTM D3849-13.

EXAMPLES

Specific examples of the present invention will be described with reference to the diagrams.

The present example is a carbon black structured as an electroconductive agent of a secondary cell, and is a carbon black comprising carbon black aggregates 2 in which the ratio PPA/d of the number of primary particles 1 (PPA) and the diameter d (nm) of the primary particles 1 is 8 or higher, as shown in FIG. 1.

More specifically, the carbon black of the present example has a ratio PPA/d of the number of primary particles 1 (PPA) and the diameter d (nm) of the primary particles 1 that is 8 to 12, and the diameter d of the primary particles 1 is 15 nm or less.

The carbon black of the present example can be manufactured using a common carbon black manufacturing furnace, specifically, a carbon black manufacturing furnace having a connected reaction-continuing and cooling chamber provided with, in sequence from the upstream side, a fuel introduction section, a starting material introduction section, a narrow cylinder section, and a reaction-stopping rapid-cooling water pressure spray device.

Table 1 below gives an example of the manufacturing conditions (operating conditions) for the carbon blacks (CB01 to CB06) of the present examples. CB11 and CB12 of Table 1 are examples (comparative examples) of the manufacturing conditions of conventional carbon black.

TABLE 1

|  | Present examples | | | | | | Comparative examples | |
| --- | --- | --- | --- | --- | --- | --- | --- | --- |
|  | CB01 | CB02 | CB03 | CB04 | CB05 | CB06 | CB11 | CB12 |
| Total air flow rate (kg/h) | 1171 | 1156 | 1136 | 1141 | 1152 | 1185 | 1065 | 1078 |
| Air preheating temperature (° C.) | 461 | 440 | 422 | 430 | 462 | 417 | 535 | 540 |
| Fuel flow rate ($m^3$/h) | 59 | 59 | 59 | 59 | 58 | 58 | 56 | 52 |
| Starting material introduction rate (kg/h) | 103 | 70 | 65 | 115 | 101 | 104 | 135 | 140 |
| Reaction-stopping water flow rate (L/hr) | 165 | 195 | 195 | 165 | 141 | 143 | 179 | 166 |

Carbon blacks (CB01 to CB06) of the present examples and conventional carbon blacks (CB11, CB12) as comparative examples were manufactured using the manufacturing conditions indicated in TABLE 1, and each of the physical properties, i.e., the amount of absorbed dibutyl phthalate (DBP), the nitrogen adsorption specific surface area (N2SA), the number of primary particles 1 constituting a carbon black aggregate 2 (PPA), and the primary particle diameter (diameter d of the primary particles 1 constituting a carbon black aggregate 2) were measured.

The measurement results as well as the physicochemical properties of conventional acetylene black (AB) used in an electroconductive agent are indicated in TABLE 2 below.

TABLE 2

|  | Present examples | | | | | | Comparative examples | | |
| --- | --- | --- | --- | --- | --- | --- | --- | --- | --- |
|  | CB01 | CB02 | CB03 | CB04 | CB05 | CB06 | CB11 | CB12 | AB |
| DBP absorption amount (mL/100 g) | 206 | 206 | 226 | 214 | 182 | 171 | 221 | 172 | 163 |
| N2SA ($m^2$/g) | 336 | 548 | 962 | 301 | 347 | 350 | 172 | 166 | 65 |
| PPA (number) | 117 | 112 | 104 | 110 | 97 | 95 | 125 | 107 | 162 |
| Primary particle diameter d (nm) | 10 | 10 | 10 | 12 | 12 | 11 | 17 | 16 | 36 |
| PPA/d (—) | 11.7 | 11.2 | 10.4 | 9.2 | 8.1 | 8.6 | 7.4 | 6.7 | 4.5 |

Each of the measurement items in TABLE 2 is described next. The amount of dibutyl phthalate (DBP) absorbed is the amount of dibutyl phthalate absorbed per 100 g of carbon black (mL/100 g carbon black) and is used as a general index for evaluating the structural characteristics of a carbon black aggregate 2. In the present examples, the DBP (dibutyl phthalate) absorption amount was measured in accordance with the method described in JIS K6217-4:2008.

The nitrogen adsorption specific surface area (N2SA) is the specific surface area per unit weight ($m^2$/g), and in the present examples, the (nitrogen adsorption specific surface area (N2SA) is measured in accordance with the method described in JIS K6217-2:2001.

The number of primary particles 1 constituting a carbon black aggregate 2 (PPA) and the diameter of the primary particles 1 were obtained by CB morphological analysis using a field emission scanning microscope (JSM-6700F, manufactured by JEOL Ltd.) in accordance with the specifications of ASTM D3849-13, the total particle number (nt in the specification) was derived, the value obtained by dividing the total particle number by the number of carbon black aggregates 2 was used as PPA, CB morphological analysis was carried out, the mean particle diameter (m in the specification) was derived, and the mean particle diameter was used as the particle diameter of the primary particles 1 (primary particle diameter).

As indicated in TABLE 2, the carbon blacks (CB01 to CB06) of the present examples have a ratio PPA/d of the number of primary particles 1 (PPA) and a diameter d (nm) of the primary particles 1 that is 8 to 12.

In contrast, the prior-art carbon blacks (CB11, CB12) and acetylene black (AB) as comparative examples are indicated to have a ratio PPA/d of the number of primary particles 1 (PPA) and a diameter d (nm) of the primary particles 1 that is less than 8.

The ratio PPA/d of the number of primary particles 1 (PPA) and diameter d (nm) of the primary particles 1 is an index indicating the shape of the carbon black aggregate 2 suited for carbon black to efficiently cover an electrode active material. The present applicants found through repeated experimentation that the ratio PPA/d of the number of primary particles 1 (PPA) and diameter d (nm) of the primary particles 1 is preferably 8 or higher, more preferably 8 to 12 being most optimal.

In other words, the present applicants confirmed from the results of repeated experimentation that when PPA/d is greater than 12, electroconductivity enhancing effect cannot be sufficiently obtained because the diameter of the primary particles 1 is extremely small in comparison with the size of the carbon black aggregate 2, the surface of the electrode active material cannot be uniformly covered, the structure of the carbon black aggregate 2 becomes bulky, dispersion characteristics in an electrode slurry are degraded during, e.g., electrode production for a secondary cell, and excessive adsorption occurs. Furthermore, it was confirmed that there is a negative effect on processability during electrode production and that electrode production costs are liable to increase due to the occurrence of excessive solvent absorption.

On the other hand, when PPA/d is less than 8, the diameter of the primary particles 1 is greater than the size of the carbon black aggregate 2, or the structure of the carbon black aggregate 2 is short. Therefore, the contact surface area of the carbon black on the electrode active material is reduced and covering performance is degraded. Consequently, it was confirmed that the electroconductivity enhancing effect cannot be sufficiently obtained, and due to the above, it was found that the ratio PPA/d of the number of primary particles 1 (PPA) constituting the carbon black aggregate 2 and the diameter d (nm) of the primary particles 1 is optimally 8 to 12.

As indicated in TABLE 2, the carbon blacks of the present examples (CB01 to CB06) have a diameter d of the primary particles 1 of 15 nm or less.

In contrast, the conventional carbon blacks (CB11, CB12) and acetylene black (AB) of the comparative examples have a primary particle diameter d that is greater than 15 nm, and in acetylene black (AB) in particular, the diameter d of the primary particles 1 is 30 nm or greater.

It was confirmed through repeated experimentation that the diameter of the primary particles 1 is preferably 15 nm or less. In other words, it was confirmed that when the diameter of the primary particles 1 is greater than 15 nm, the contact surface area of on the electrode active material is reduced and the surface electroconductivity effect is reduced.

With current production technology, it is very difficult to produce carbon black that has a diameter of less than 8 nm and the lower limit of the diameter of the primary particles 1 is 8 nm in terms of production, but 8 nm is not the lower limit in terms of the characteristics of the carbon black.

The carbon blacks (CB01 to CB06) of the present examples produced in this manner are suitable as an electroconductive agent in a secondary cell.

Evaluation results related to secondary cells fabricated using the carbon blacks (CB01 to CB06) of the present examples are indicated below.

In the present examples, secondary cells were fabricated using the following method.

Lithium titanate was used as the electrode active material, the carbon blacks (CB01 to CB06) of the present examples, the carbon blacks (CB11, CB12) of the comparative examples, and acetylene black (AB) were used as electroconductive agents, polyvinylidene fluoride was used as a binder, and N-methylpyrrolidone was used as a solvent. Each was mixed together in a predetermined ratio to form an electrode slurry. The slurry was coated onto a copper foil, dried, and thereafter pressed to form an electrode. An opposing electrode was fabricated in similar fashion using lithium cobaltate as the electrode active material.

The electrodes, a separator, and electrolytic fluid were combined together to obtain a laminated cell designed with a capacity of 6.6 mAh.

TABLE 3 indicates the measurement results obtained by measuring the electrochemical properties, i.e., the charge capacity (mAh), discharge capacity (mAh), charge-discharge efficiency (%), and cycle characteristics (%) in the laminated cells in which the carbon blacks (CB01 to CB06) of the present examples, the carbon blacks (CB11, CB12) of the comparative examples, and acetylene black (AB) were used as electroconductive agents.

TABLE 3

|  |  |  | Present examples |  |  |  |  |  | Comparative examples |  |  |  |
|---|---|---|---|---|---|---|---|---|---|---|---|---|
| Electrode composition | Electroconductive agent used |  | CB01 | CB02 | CB03 | CB04 | CB05 | CB06 | CB11 | CB12 | AB | AB |
|  | Electrode active material (wt %) |  | 86.5 | 86.5 | 86.5 | 86.5 | 86.5 | 86.5 | 86.5 | 86.5 | 82.0 | 86.5 |
|  | Electroconductive agent (wt %) |  | 6 | 6 | 6 | 6 | 6 | 6 | 6 | 6 | 8 | 6 |
|  | Binder (wt %) |  | 7.5 | 7.5 | 7.5 | 7.5 | 7.5 | 7.5 | 7.5 | 7.5 | 10.0 | 7.5 |
| Electrochemical properties | Charge capacity (mAh) | 1st | 6.55 | 6.72 | 6.70 | 6.58 | 6.66 | 6.68 | 6.62 | 6.5 | 6.75 | 6.63 |
|  |  | 2nd | 5.66 | 5.71 | 5.72 | 5.69 | 5.68 | 5.65 | 5.58 | 5.56 | 5.75 | 5.55 |
|  |  | 3rd | 5.63 | 5.70 | 5.69 | 5.65 | 5.64 | 5.62 | 5.45 | 5.39 | 5.71 | 5.35 |
|  | Discharge capacity (mAh) | 1st | 5.62 | 5.68 | 5.70 | 5.67 | 5.66 | 5.61 | 5.57 | 5.54 | 5.74 | 5.52 |
|  |  | 2nd | 5.61 | 5.68 | 5.67 | 5.64 | 5.63 | 5.60 | 5.48 | 5.4 | 5.70 | 5.38 |
|  |  | 3rd | 5.61 | 5.68 | 5.68 | 5.63 | 5.63 | 5.58 | 5.39 | 5.31 | 5.67 | 5.28 |
|  | Charge-discharge capacity (%) | 1st | 85.8 | 84.5 | 85.1 | 86.2 | 85.0 | 84.0 | 84.1 | 85.2 | 85.1 | 83.3 |
|  |  | 2nd | 99.2 | 99.5 | 99.1 | 99.1 | 99.1 | 99.1 | 98.2 | 97.1 | 99.1 | 96.9 |
|  |  | 3rd | 99.6 | 99.6 | 99.8 | 99.6 | 99.8 | 99.3 | 98.9 | 98.5 | 99.3 | 98.7 |
|  | Cycle characteristic (%) | 200th | 91 | 93 | 92 | 90 | 90 | 88 | 80 | 77 | 90 | 78 |

The measurement items in the present examples as noted in TABLE 3 will be described. The measurement items were measured using a charge-discharge measurement device SD8 (manufactured by Hokuto Denko Corp.)

Specifically, the charge capacity (mAh) and discharge capacity (mAh) were both measured at a temperature of 25° C., 0.2 C (C being the charge-discharge rate), and a cutoff voltage of 1.5 to 2.7 V.

The charge-discharge efficiency (%) was calculated in accordance with the following formula using the measurement values of the charge capacity (mAh) and the discharge capacity (mAh) measured by the method described above.

Charge-discharge efficiency (%)=Discharge capacity (mAh)/Charge capacity (mAh)×100

The cycle characteristics were obtained by carrying out 200 charge and discharge cycles and measuring the reduction ratio from the initial cell capacity.

The laminated cells in which the carbon blacks (CB01 to CB06) of the present examples were used as the electroconductive agent were compared with the laminated cells in which the carbon blacks (CB11, CB12) of the comparative examples and the acetylene black (AB) were used as an electroconductive agent, and, from the evaluation results (measurement results) shown in TABLE 3, were confirmed to indicate higher numerical values for both charge and discharge capacities and to indicate properties equal to or greater than acetylene black (AB) in particular, even when the addition amount of electroconductive agent is reduced.

In other words, the properties were substantially equal in a comparison of 6 wt % of the carbon blacks (CB01 to CB06) of the present examples and 8 wt % of the acetylene black (AB), but when 6 wt % of acetylene black (AB) is used in similar fashion to the carbon blacks (CB01 to CB06) of the present examples, the properties of the carbon blacks (CB01 to CB06) of the present examples are clearly superior, considerable reduction in the charge-discharge cycles is not observed, and results indicate that the charge-discharge efficiency is kept at a high value. The carbon blacks of the present examples were thereby verified to achieve improved electroconductive performance and accordingly improved cell performance.

Figure 2:
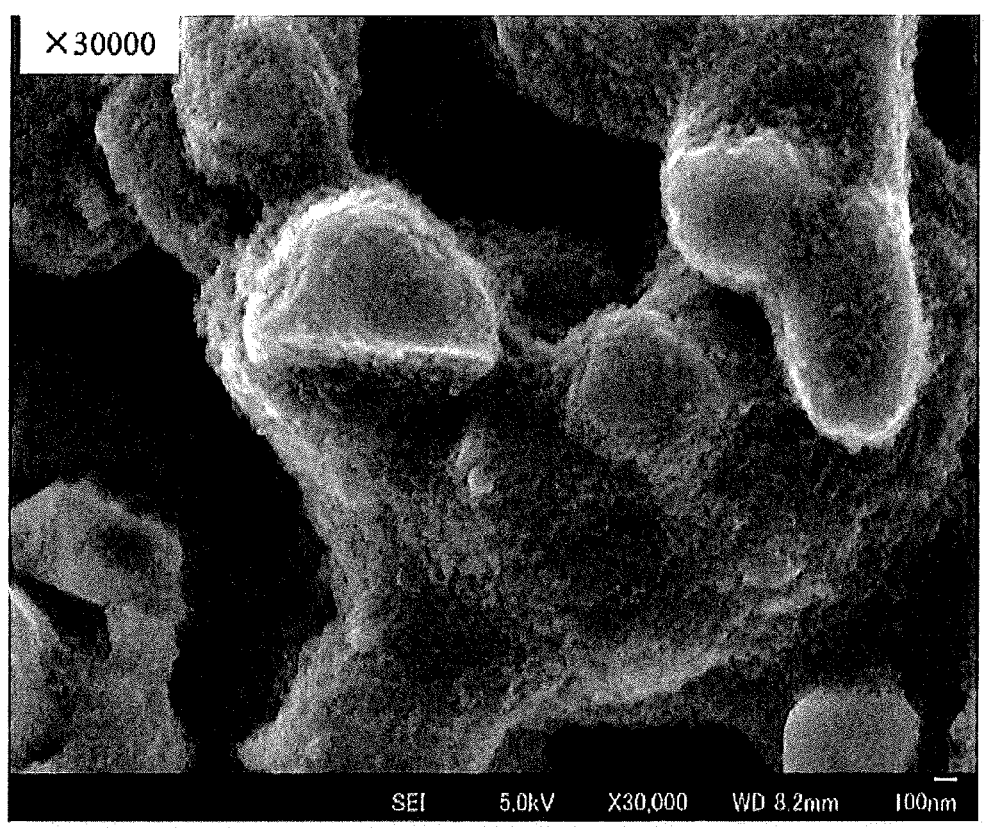
FIG. 2 is a SEM image showing the state in which the carbon black of the present example has covered the electrode active material.
Figure 3:
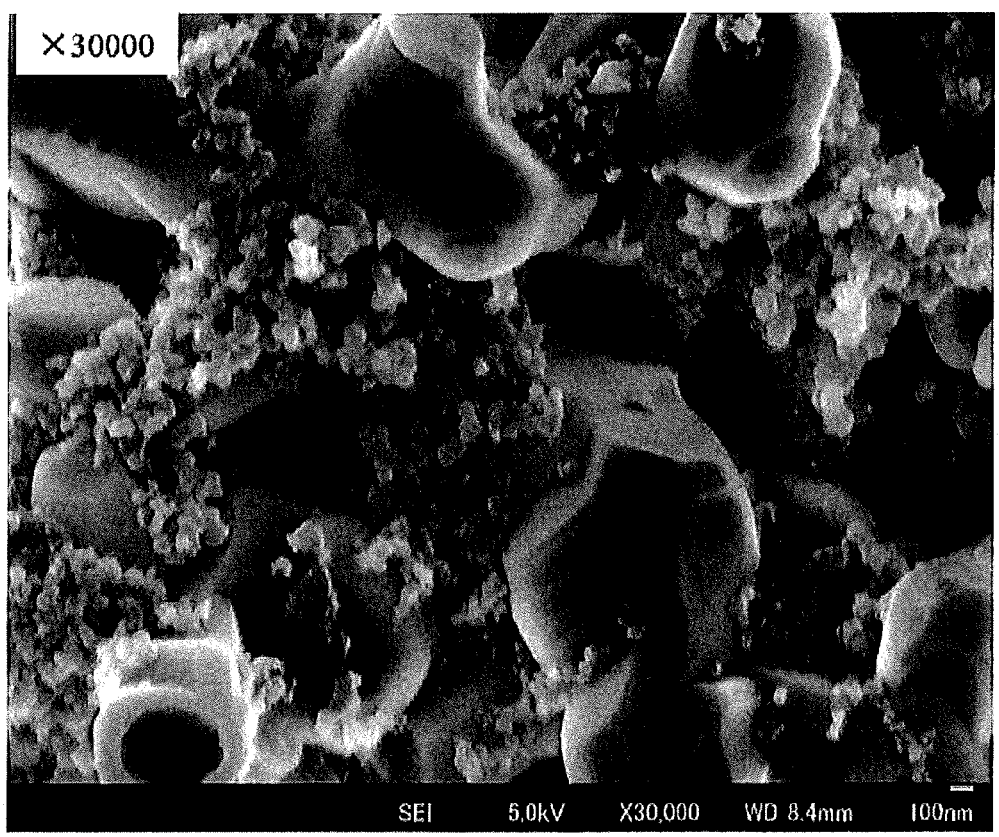
FIG. 3 is a SEM image showing the state in which the acetylene black of the conventional example has covered the electrode active material.

As further support of the above, FIGS. 2 and 3 show the result of confirming the covering characteristics of the carbon blacks of the present examples and the acetylene black on an electrode active material.

In FIGS. 2 and 3, both images show the state in which a carbon black of the present example and acetylene black have covered an electrode active material, which is amorphous particles having a size of about 1 μm. FIG. 2 is a SEM image of electrode active material covered by the carbon black of the present example, and FIG. 3 is an SEM image of electrode active material covered by acetylene black.

It can be discerned from FIG. 2 that the carbon blacks of the present examples evenly and uniformly cover the entire surface of the electrode active material.

On the other hand, it can be discerned from FIG. 3 that the acetylene black is evenly present on the surface of the electrode active material.

Thus, the carbon blacks of the present examples efficiently cover the surface of the electrode active material.

The carbon black CB06 of the present examples has slightly inferior characteristics in comparison with the other carbon blacks CB01 to CB05 of the present examples.

The carbon black CB06 of the present examples has a DBP absorption amount of 171 (mL/100 g carbon black) as seen in TABLE 2, which is lower than the DBP absorption amount of the other carbon blacks CB01 to CB05 of the present examples.

It has been confirmed that when the value of the DBP absorption amount is reduced, the development of the branched structure of the carbon black aggregate 2 is reduced, the shape approaches that of a sphere, and the characteristic of covering the surface of an electrode active material tends to be reduced.

Therefore, the DBP absorption amount is preferably 180 (mL/100 g carbon black) or higher.

The present invention is not limited to the present examples, and the specific configuration of the various constituent features can be design as appropriate.

The invention claimed is:

1. An electroconductive agent comprising a carbon black aggregate in which the diameter (d) of carbon black primary particles constituting the carbon black aggregate is 15 nm or less, the ratio (PPA/d) of the number of the carbon black primary particles (PPA) contained in a single mass of the carbon black aggregate and the diameter (d) of the carbon black primary particles is 8 to 12, the dibutyl phthalate (DBP) absorption amount is 180 mL/100 g or more, and the nitrogen adsorption specific surface area is 300 $m^2$/g or higher.

2. The electroconductive agent according to claim 1, wherein the diameter (d) of the carbon black primary particles is 8 nm to 15 nm.

3. The electroconductive agent according to claim 1, wherein the dibutyl phthalate (DBP) absorption amount is 180 to 226 mL/100 g.

4. A secondary cell comprising an electrode active material i-s-covered by an electroconductive agent, the electroconductive agent comprising a carbon black aggregate in which the diameter (d) of carbon black primary particles constituting the carbon black aggregate is 15 nm or less, the ratio (PPA/d) of the number of the carbon black primary particles (PPA) contained in a single mass of the carbon black aggregate and the diameter (d) of the carbon black primary particles is 8 to 12, the dibutyl phthalate (DBP) absorption amount is 180 mL/100 g or more, and the nitrogen adsorption specific surface area is 300 $m^2$/g or higher.

5. The secondary cell according to claim 4, wherein the diameter (d) of the carbon black primary particles is 8 nm to 15 nm.

6. The secondary cell according to claim 4, wherein the dibutyl phthalate (DBP) absorption amount is 180 to 226 mL/100 g.

* * * * *